Patented Dec. 17, 1929

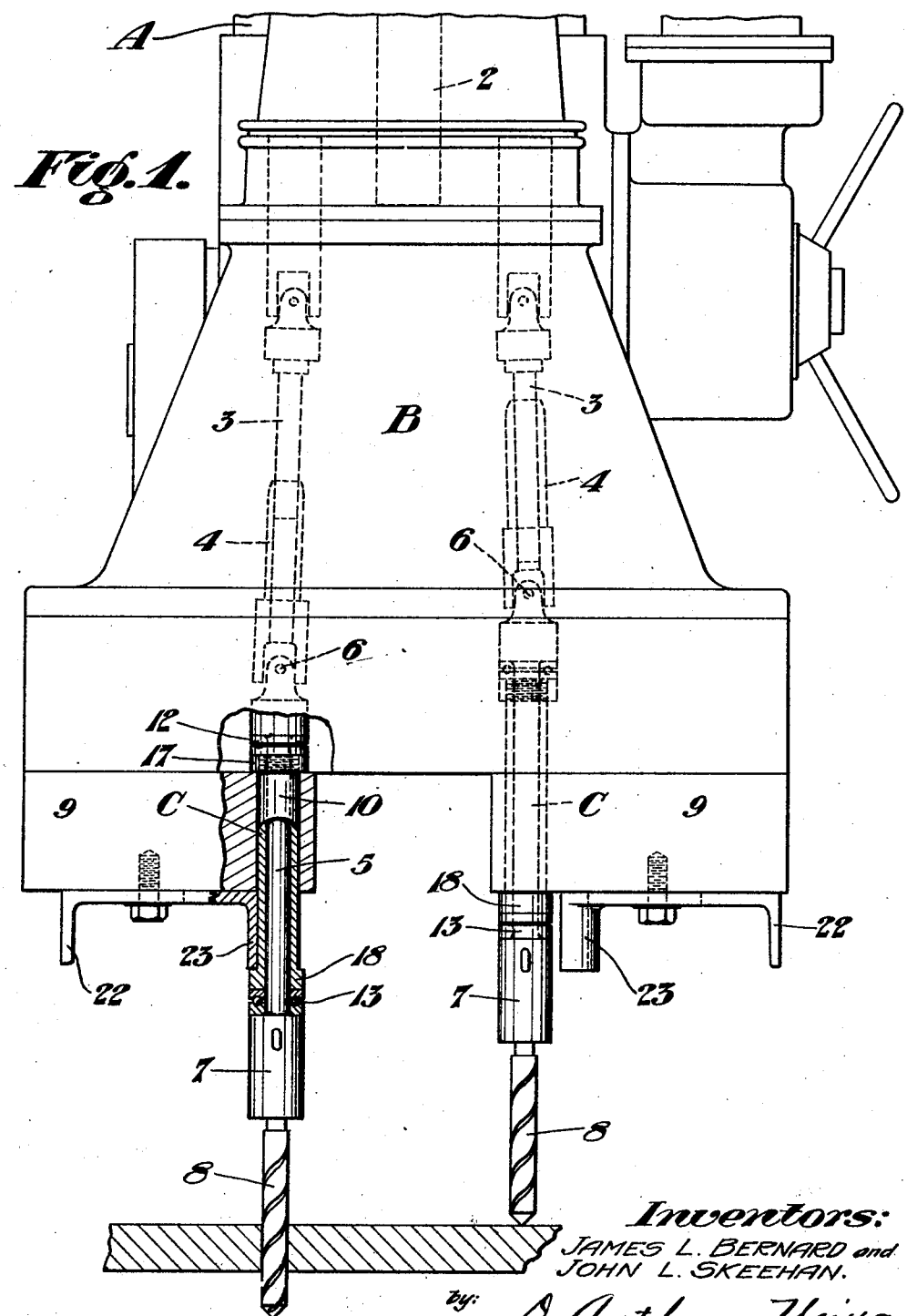

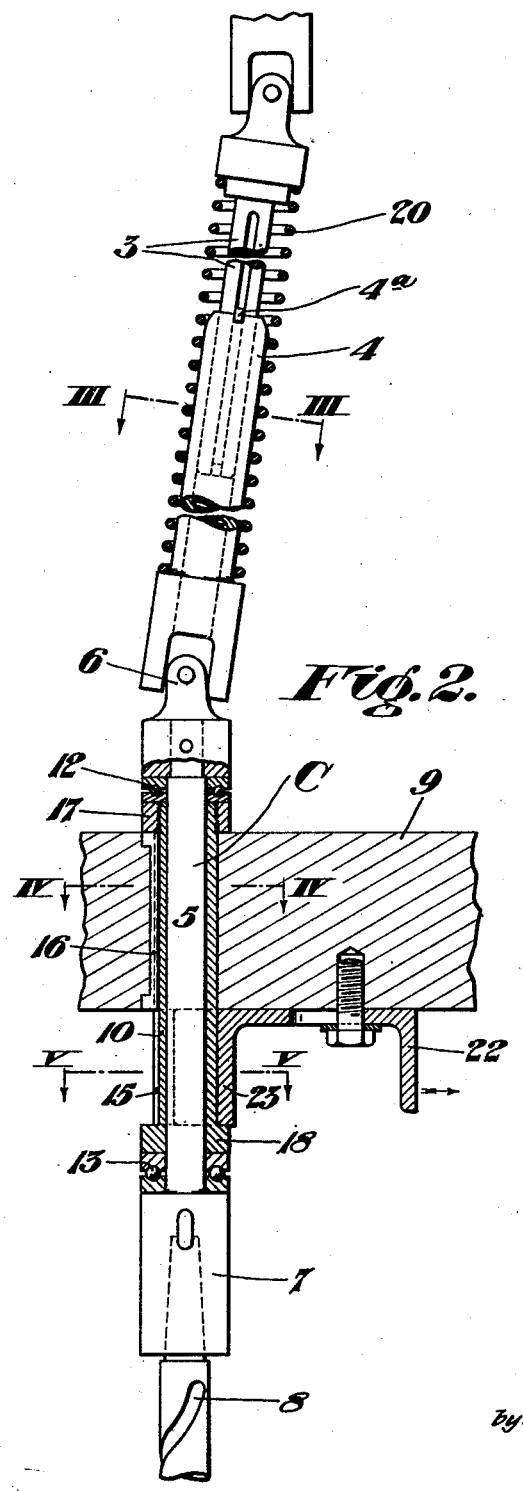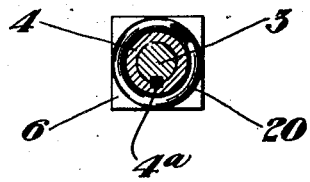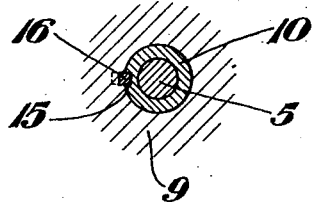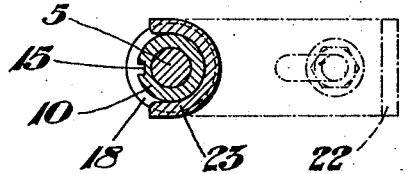

1,740,149

UNITED STATES PATENT OFFICE

JAMES L. BERNARD, OF BEAVER, AND JOHN L. SKEEHAN, OF BADEN, PENNSYLVANIA

MULTIPLE-SPINDLE DRILLING MACHINE

Application filed December 16, 1927. Serial No. 240,556.

This invention relates to drilling machines and more particularly to multiple spindle drilling machines, and has for its object the provision of means whereby selected ones of said spindles may be rendered inoperative, for movement into the work-piece, as desired.

In drilling machines of this type it has heretofore been necessary to remove the drills from any spindles not necessary to drill the holes desired at each operation. In some instances one operation may necessitate the use of an entire gang of twelve or more drills, while the next operation may be that of drilling one, two or three holes. Therefore, it would be necessary to remove all the drills except those in line with the holes to be drilled. In the very next operation, it may be necessary to again use all the drills which would necessitate the remounting of all the drills removed prior to the last operation.

From the above it will be readily understood that much of the operator's time is taken up in removing and mounting the drills in the standard gang or multiple spindle drilling machines now in use.

The present invention overcomes the necessity for removing the drills, since any one or any number of the drill spindles may be readily rendered inoperative to feed into the work.

In the drawings—

Figure 1 is a side elevation, partly in section, of a portion of a drilling machine made in accordance with our invention.

Figure 2 is a sectional side elevation of the apparatus shown in Figure 1.

Figures 3, 4 and 5 are sectional plans taken, respectively on the lines III—III, IV—IV and V—V of Figure 2.

Referring more particularly to the drawings, the letter A designates the drill column or stand which supports the usual drill head B. The drill head B is adapted to be moved on the drill column or stand A to feed the drills into the work.

The drill head B is of standard construction and has a plurality of drill spindles C journaled therein and connected to the drive shaft 2 in the usual manner.

Following the established practice of constructing universal joints to allow for lengthening or shortening caused by change of angularity due to different positioning of the drill spindles for varying clusters of holes to be drilled, the stem, 3, of the upper joint, is telescopically mounted in the sleeve, 4, of the lower joint, and transmits motion of rotation to same by means of key 4ª. The stem, 3, is shown attached to upper joint, and the sleeve, 4, is shown on the lower joint in this illustration, but the positions of the stem and sleeve may be reversed according to the taste or judgment of the designer. In our invention the universal joints of spindle C are modified from the usual construction by the provision for greater telescoping travel, on each other, of the stem, 3, and the sleeve, 4, than is ordinarily provided. This provision for extra travel is to permit the shortening of the section when the spindle is retracted as described later.

A rigid spindle section 5 is connected to the sleeve portion 4 of the yieldable section by a universal joint 6, and terminates in a spindle head 7 in which the drills 8 are mounted.

The drill head B terminates at its drill end in a bridge piece or plate 9 having apertures through which the spindle sections 5 project. A sleeve 10 is mounted on each of the spindle sections 5 and said spindle sections are free to rotate relative to said sleeves. Anti-friction bearings 12 and 13 are mounted between the respective ends of the sleeve 10 and the ends of the spindle section 5. The anti-friction bearing 12 bears against the universal joint 6 and the bearing 13 bears against the spindle head 7.

The sleeve 10 is provided with a keyway 15 and a key 16 is mounted in the bridge piece 9 and the keyway 15 so as to permit the bridge piece to slide lengthwise relative to the sleeve 10 and to prevent the sleeve 10 from rotating relative to the bridge piece. The sleeve 10 is provided with shoulders 17 and 18 at its respective ends adapted to be engaged by the bridge piece 9.

The bridge piece 9 is of materially less thickness than the length of the sleeve 10 so as to provide for free movement of said bridge piece relative to the sleeve 10 and spindle.

A coiled spring 20 is mounted around the yieldable section of the spindle and has one end engaged with the stem 3 and its other end engaged with the sleeve 4 so as to normally maintain said parts in extended position.

It will be understood that if desired the spring 20 may be dispensed with in a vertically disposed drilling machine, since gravity may be depended upon to maintain the drill spindles in extended position.

A gag member 22 is slidably mounted on the bridge piece 9 adjacent each of the drill spindles and is provided with a U-shaped gag portion 23 adapted to fit snugly between the shoulder 18 on the outer end of the sleeve 10 and the outer face of the bridge piece so as to lock the bridge piece and sleeve against relative movement.

In operation, when all the drills are to be used to drill a work-piece, all the gags 22 will be moved toward the drill spindles so that their gag portions 23 will be engaged around the sleeve 10 between the bridge plate 9 and the shoulder 18. When the gags 22 are thus positioned, a movement of the drill head B toward the work-piece will cause the bridge piece 9 to deliver a thrust through the gags 22 to the drill spindles so as to feed all of the drills into the work.

Now, assuming that some of the drills are to remain inoperative in the next drilling operation, it will only be necessary to withdraw the gags 22 from their gagging position, between the bridge piece 9 and shoulder 18, with the drill spindles to remain inoperative and to operate the drill head in the usual manner. The drills in the drill spindles from which the gags have been withdrawn will not be fed into the work, due to the fact that the bridge piece 9 is free to move longitudinally relative to the spindles.

It will be readily understood that a number of operative drill spindles can thus be readily changed by simply inserting or withdrawing the gags 22 from between the bridge piece 9 and the lower end of the spindles.

While we have shown and described one specific embodiment of our invention, it will be understood that we do not wish to be limited thereto since various modifications may be made without departing from the scope of our invention as defined in the appended claim.

We claim—

The combination with a drilling machine including a drill head, of a plurality of drill spindles mounted on said head, each of said spindles having a telescoping section, yielding means tending to normally maintain said sections extended, sleeves in which the lower ends of said spindles are rotatably mounted, anti-friction bearings at each end of said sleeves to prevent relative longitudinal movement of the sleeves and said spindles, a bridge member slidable longitudinally relative to said sleeves, integral shoulders on the lower ends of said sleeves, and gag members slidably mounted on said bridge member, said gag members having a U-shaped gage portion adapted to be moved into and out of position between said bridge member and said shoulders on said spindles, said gag members when positioned between said bridge member and said shoulders on said spindles being adapted to cause said bridge member to move said spindles toward the work.

In testimony whereof, we have hereunto signed our names.

JAMES L. BERNARD.
JOHN L. SKEEHAN.